(12) United States Patent
Bureau et al.

(10) Patent No.: US 7,591,937 B2
(45) Date of Patent: Sep. 22, 2009

(54) METHOD OF FIXING MACRO-OBJECTS TO AN ELECTRICITY CONDUCTING- OR SEMI-CONDUCTING SURFACE BY MEANS OF ELECTROGRAFTING, SURFACES THUS OBTAINED AND APPLICATIONS THEREOF

(75) Inventors: Christophe Bureau, Suresnes (FR); Guy Deniau, Auffargis (FR); José Gonzalez, Le Chatelet en Brie (FR); Serge Palacin, Montigny le Bretonneux (FR)

(73) Assignee: Commissariat a l'Energie Atomique (FR)

( * ) Notice: Subject to any disclaimer, the term of this patent is extended or adjusted under 35 U.S.C. 154(b) by 744 days.

(21) Appl. No.: 10/508,665

(22) PCT Filed: Mar. 19, 2003

(86) PCT No.: PCT/FR03/00877

§ 371 (c)(1),
(2), (4) Date: Apr. 4, 2005

(87) PCT Pub. No.: WO03/080748

PCT Pub. Date: Oct. 2, 2003

(65) Prior Publication Data

US 2005/0170195 A1    Aug. 4, 2005

(30) Foreign Application Priority Data

Mar. 26, 2002   (FR)   ................................... 02 03796

(51) Int. Cl.
*C25D 11/32*      (2006.01)
*C25D 11/34*      (2006.01)
(52) U.S. Cl. ........................ 205/317; 205/235; 205/157; 205/149; 438/758; 438/510; 438/613; 438/22; 438/29; 29/852; 29/830; 29/831
(58) Field of Classification Search ................. 205/317, 205/235; 438/758, 510, 613, 22, 29; 29/852, 29/830, 831
See application file for complete search history.

(56) References Cited

U.S. PATENT DOCUMENTS 7,119,030 B2 * 10/2006 Bureau et al. ................ 438/758
2002/0018672 A1 * 2/2002 Ozawa et al. ................ 399/270

FOREIGN PATENT DOCUMENTS

EP      0 169 804 A      1/1986
FR      2 745 303 A      8/1997

OTHER PUBLICATIONS

Translation of WO 2004/018573, 43 pages.*
Xudong Lou, "Electrografting of Preformed Aliphatic Polyesters Onto Metallic Surfaces", *American Chemical Society*, Jan. 3, 2002, pp. 2785-2788.

* cited by examiner

*Primary Examiner*—Bruce F Bell
(74) *Attorney, Agent, or Firm*—Alston & Bird LLP

(57) ABSTRACT

The invention relates to a method of fixing macro-objects to an electricity conducting- or semi-conducting surface by means of electrografting. The invention also relates to the electricity conducting- or semi-conducting-surfaces obtained using the aforementioned method and to the applications of same.

14 Claims, 5 Drawing Sheets

METHOD OF FIXING MACRO-OBJECTS TO AN ELECTRICITY CONDUCTING- OR SEMI-CONDUCTING SURFACE BY MEANS OF ELECTROGRAFTING, SURFACES THUS OBTAINED AND APPLICATIONS THEREOF

CROSS REFERENCE TO RELATED APPLICATIONS

This application is a national stage application filed under 35 U.S.C. 371 of International Application No. PCT/FR03/000877, filed Mar. 19, 2003, published as WO 03/080748 A1, which claims priority from French patent application 02 03796, filed Mar. 26, 2002.

FIELD AND BACKGROUND OF THE INVENTION

The present invention relates to a method of attaching macro-objects to an electrically conducting or semiconducting surface by means of electrografting, and also to the electrically conducting or semiconducting surfaces obtained using this method and to applications thereof.

The production of electrically conducting or semiconducting surfaces covered with macro-objects and in particular with polymer films is of great interest in many fields, in particular for the manufacture of electronic components or of integrated optical devices, for producing devices that can be used in the biomedical field or in biotechnology (DNA chips, protein chips, etc.), for anticorrosive protection, and also for any modifications of the superficial properties of metals or of semiconductors.

It appears to be accepted, today, that the obtaining of grafted polymer films by electrografting of activated vinyl monomers on conducting surfaces takes place by means of electroinitiation of the polymerization reaction from the surface, followed by chain growth, monomer by monomer. The reaction mechanism of electrografting has in particular been described in the articles by C. Bureau et al., Macromolecules, 1997, 30, 333; C. Bureau and J. Delhalle, Journal of Surface Analysis, 1999, 6(2), 159 and C. Bureau et al., Journal of Adhesion, 1996, 58, 101.

By way of example, the reaction mechanism for the electrografting of acrylonitrile by cathode polarization can be represented according to SCHEME 1 below, in which the grafting reaction corresponds to step No. 1, where the growth takes place from the surface; step No. 2 being the main parasite reaction which results in a nongrafted polymer being obtained:

SCHEME 1

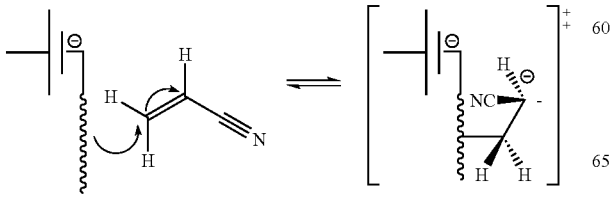

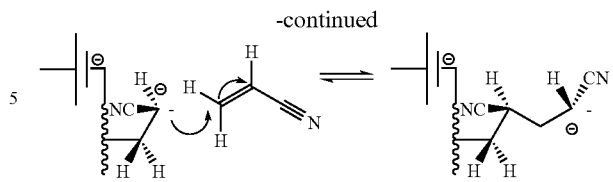

-continued

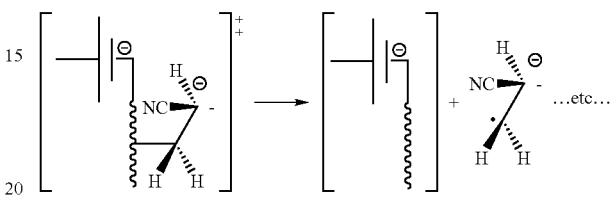

1: Surface Chemical Reaction, Grafting

2: Desorption, Polymerization in Solution

The growth of the grafted chains therefore takes place by means of purely chemical polymerization, i.e. independently of the polarization of the conducting surface which has given rise to the grafting. This step is therefore sensitive to (it is in particular interrupted by) the presence of chemical inhibitors of this growth, in particular through protons.

In scheme 1 above, in which the electrografting of acrylonitrile with cathode polarization is considered, the grafted chain growth takes place by anionic polymerization. This growth is interrupted in particular by protons, and it has been demonstrated that the proton content even constitutes the major parameter which controls the formation of polymer in solution, and also the information recovered in the course of synthesis, in particular the appearance of the voltammograms which accompany the synthesis (see in particular the article by C. Bureau, Journal of Electroanalytical Chemistry, 1999, 479, 43).

Traces of water, and more generally labile protons from protic solvents, constitute sources of protons that are prejudicial to the growth of the grafted chains.

Even before the reaction mechanisms for the electrografting of vinyl monomers were understood, this technical stumbling block had been clearly identified by those skilled in the art, as witnessed by the details of the various methods developed on the basis of these compounds:

in patent application FR-A-2 480 314, the authors mention a method of electrografting vinyl monomers consisting in preparing a solution having a water content at most equal to $10^{-3}$ mol/l, and even specify, in a preferred embodiment, that this water content should at most be equal to $5 \times 10^{-4}$ mol/l;

in patent application EP-A-0 618 276, the authors mention a method of electrografting vinyl monomers using an aprotic solvent;

in patent application EP-A-0 665 275, the authors also mention a method of electrografting vinyl monomers using aprotic organic solvents. In addition, the description section of that prior application specifies that the water content of the electrolysis bath is preferably less than $10^{-3}$ M. Thus, and before electrolysis, the electrolysis bath is degassed by bubbling through an inert gas containing at most 5 ppm of water and 10 ppm of oxygen;

in U.S. Pat. No. 6,180,346, the authors use a method of electropolymerization of molecules comprising vinyl substituents. By way of example, they mention the use of acetonitrile as solvent and specify that this should be dried before use, which, for those skilled in the art, reflects a residual water content of the order of a few tens of ppm at most.

The very low water contents required by the electrografting of vinyl monomers are in general maintained, according to the teaching of the documents of the prior art mentioned above, during or before synthesis, via various dehydration techniques such as, for example, via sparging of dry inert gas (nitrogen, argon, etc.), the water content of which is of the order of a few ppm.

For similar reasons of control of the content of proton sources in the reaction medium, only aprotic solvents, and monomers which are themselves aprotic, i.e. which do not comprise functional groups having acid functions (in the Brönsted sense) in the study solvent, have been proposed for obtaining electrografted organic films.

In practice, the water content of these solvents is decreased at the cost of a long and laborious preparation, for example via a period of time on dehydrating compounds such as phosphorus pentoxide ($P_2O_5$) or on molecular sieves (for example with a porosity of 4 ångströms), via distillation under reduced pressure of rare inert gases (nitrogen, argon, etc.) or via a combination of these methods. It is thus noted:

in patent application FR-A-2 480 314, that the authors recommend the use of an aprotic organic solvent which does not give a parasite reaction with the monomer used;

in patent application EP-A-0 618 276, the authors also recommend the use of aprotic solvents; and in patent application EP-A-0 665 275, besides mentioning the use of aprotic solvents, the authors state the monomer structures that can be used and specify that the possible protic functional groups of the monomer(s) should be pre-masked.

In practice, the monomers used for electrosynthesis are distilled before use, so as to remove various additives, and in particular the polymerization inhibitors added by the manufacturer in order to stabilize the product and to avoid its polymerization in the bottle under storage conditions.

It will be noted only that patent application EP-A-0 665 275 mentions the use of specific inhibitors so as to be able to introduce new functionalities at the end of the growing polymer chains. However, it has been demonstrated, in particular in the article by C. Bureau et al., 1996 (previously mentioned), that the growth of the polymer chains on the surface is necessarily anionic, and it is probable that the radical inhibitors introduced by the authors are in the film at the end of synthesis because they are adsorbed and/or reduced on the surface of the electrode (they are in general electroactive), and not because they interrupt the chain growth as indicated in patent application EP-A-0 665 275.

Finally, and most recently, there has also been proposed a method of forming polymer films on an electricity-conducting surface by electrografting, in anhydrous medium, of preformed polymers, and in particular of polyesters, these polymers being functionalized with electrograftable pendant groups such as acrylate groups (Lou et al., American Chemical Society, Langmuir, ASAP articles, 2002, available on the Internet at the following address: http://pubs.acs.org/isubscribe/journals/langd5/pdf/la011289g.pdf; C. Detrembleur et al., Angewandte Chemie International Edition in English, 2001, 40, 1268). According to the authors, this electrografting is carried out under strictly anhydrous operating conditions. In addition, in order to obtain a film of good quality, the authors indicate that the polymer intended to be electrografted should comprise a minimum number of pendant electrograftable groups for the adsorption of the polymers to the metal surface to be able to take place. According to that article, this minimum number appears to correspond to a degree of substitution of greater than approximately 40%, i.e. 40% of the monomer units of the polymeric chain carry an acrylate group. Finally, it is also indicated that, if the concentration of acrylate of the preformed polymer in the electrolyte solution is greater than a certain value, then no electrografting takes place. This limiting concentration appears to depend on the degree of substitution of acrylate groups along the chain, but appears to be of the order of 3 mol/l of acrylate groups.

Due to these strict limitations relating at once to the solvents and the types of monomers of synthesis, to the water content in the reaction medium and, finally, to the number and the concentration of the electrograftable groups to be used, the electrografting of vinyl monomers or of preformed polymers comprising pendant electrograftable groups, to electrically conducting or semiconducting surfaces, remains a process that it is difficult to apply on an industrial scale.

In addition, all these conditions—which therefore relate both to the nature of the monomer and to the reaction medium—are very restrictive since they exclude a considerable number of macromolecules from the list of compounds which can be attached by electrografting, and in particular:

macromolecules which are not polymers, in the strict sense of the term, i.e. which do not constitute a macromolecule resulting from the repetition of the same unit. Mention may be made, for example, of macromolecules of biological interest, such as oligonucleotides and single- or double-stranded DNA, single- or double-stranded RNA, oligopeptides, proteins and in particular enzymes, antibodies, or else growth factors, cellulose and modified celluloses, dextrans, chitosans and more generally polysaccharides, and also any macromolecules resulting from mixtures or from these base units (such as, for example, peptidoglycans, etc.). Mention may also be made of all the macro-structures that are nonpolymeric and not strictly macromolecular, such as, for example, those obtained by crosslinking of a two- or three-dimensional network, for instance rubber, etc., liposomes and all the macro-ions or the mineral aggregates of any types, such as, for example, silica beads, nano-objects, nanobeads, nanotubes, fullerenes, etc.), living cells, etc.;

polymers not resulting from the polymerization or from the copolymerization of vinyl monomers and/or of cyclic molecules. This concerns in particular all the polymers or copolymers obtained by condensation reactions, in particular when they carry protic groups, polymers or copolymers of lactic acid, of glycolic acid and of ε-caprolactone, nylon and more generally polyamides, polysiloxanes, poly(ortho esters), polymers or copolymers which can only be obtained by radical polymerization, whatever the nature of the monomer, such as polyisoprene or parylenes, or else polymers or copolymers obtained by a polymerization of Ziegler-Natta type, by Diels-Alder reactions, etc.

Therefore, in order to remedy these major problems, the applicant has developed that which is the subject of the invention.

It in particular gave itself the aim of providing a method for electrografting all types of macro-objects onto electrically conducting or semiconducting surfaces, at water contents at least one hundred to one thousand times higher, with a simplified control of the atmosphere during synthesis, in solvents that are not necessarily aprotic, and with reagents and/or solvents that are not distilled, i.e. still containing their possible initiators.

BRIEF SUMMARY OF THE INVENTION

A first subject of the present invention is therefore a method of attaching macro-objects to an electrically conducting or semiconducting surface by electrografting, characterized in that it consists:
a) in preparing an electrolyte solution comprising, in dissolved, particulate or emulsified form, at least one macro-object consisting of a macrostructural portion functionalized with at least one electroactive group and capable of resulting in the electrografting of said macro-object to said surface, said electrolyte solution having a proton content of greater than or equal to 50 ppm; then
b) in electrolyzing said solution in an electrolysis cell using the conducting or semiconducting surface to be coated as working electrode and at least one counterelectrode, so as to result, by electroreduction or electrooxidation of said solution, in a grafted coating of said macro-object or of its condensation products on said surface.

Unlike the teaching of the prior art which prohibits the presence of protons during reactions comprising electropolymerization or electrografting of preform polymers, the method in accordance with the present invention, which necessarily uses a minimum amount of protons, makes it possible, extremely surprisingly, to bring about the electrografting of all types of macro-objects comprising at least one pendant electrograftable group, whatever the concentration of the groups in the electrolyte solution.

Surprisingly, the presence of protons promotes stabilization of the growing electrografted layer, whatever the size of the chain formed by polymerization of the pendant electroactive groups.

As a result, the method in accordance with the invention has not only the advantage of allowing the electrografting of macro-objects or of macromolecules that it was not possible to electrograft onto conducting or semiconducting surfaces according to the techniques previously available to those skilled in the art in particular, due to their proton content, but it also makes it possible to make the operating conditions under which this electrografting can take place more manageable, thus avoiding the use of prior distillations of the solvents and reagents and thus resulting in the industrial feasibility of the invention.

Thus, by means of this method, it is possible to obtain:
organic films which are chemically grafted onto the surface of the working electrode and the thickness of which can be adjusted by means of the synthesis conditions; these films withstand rinsing, and in particular rinsing with ultrasound;
organic covering films on any conducting or semiconducting surface which can, simultaneously, provide protection against the outside environment (for example against corrosion) and/or offer a grafted coating having organic functional groups that are useful for post-functionalization;
on any electrically conducting or semiconducting surface, the properties, in the form of a grafted film, of any type of polymer or of macro-objects.

According to an advantageous embodiment of the method in accordance with the invention, the proton content ranges between 50 and 100 000 ppm, approximately.

The protons in the electrolyte solution can be provided by the solvents making up this solution and/or by the macro-objects which are themselves used in the course of the electrografting method and are present in the electrolyte solution.

For the purpose of the present invention, the term "macro-object" is intended to mean any polymeric or nonpolymeric macrostructure functionalized with at least one group that is electroactive (i.e. which can be electroreduced or electrooxidized) by cathode or anode polarization, in the electrolyte solution, on an electrically conducting or semiconducting surface, and the product(s) of reduction (respectively oxidation) of which form chemical bonds with the surface.

The electroactive groups that can be used according to the method in accordance with the invention are preferably chosen from:
electrophilic groups capable of undergoing a nucleophilic addition from a nucleophilic growth site of an electroinitiated polymer;
nucleophilic groups capable of effecting a nucleophilic addition on an electrophilic growth site of an electroinitiated polymer.

Among the electrophilic groups, mention may in particular be made of vinyl groups activated with electron-withdrawing groups such as, for example, the groups: methacrylate, acrylate, vinyl chloride, acrylonitrile, methacrylonitrile, 4-vinylpyridine, 2-vinylpyridine, etc., or else with cyclic groups cleavable by nucleophilic or electrophilic attack, such as epoxy groups and, more generally, oxiranes, lactones, etc.

Among the nucleophilic groups, mention may in particular be made of vinyl groups activated with electron-donating groups such as, for example, the group consisting of 4-vinylpyridine, 2-vinylpyridine, N-vinylpyrrolidone, etc., or else with cyclic groups cleavable by nucleophilic or electrophilic attack, such as epoxy groups or, more generally, oxiranes.

It may be, for example, any crosslinked or noncrosslinked polymer functionalized at the end of or along its chain, or else in crosslinking zones, or any totally or partially functionalized macromolecule, or an object of nanometric or micrometric size or greater, the surface of which it has been possible to functionalize with at least one electrophilic (respectively nucleophilic) group capable of undergoing a nucleophilic addition from a (respectively of effecting a nucleophilic addition on a) nucleophilic (respectively electrophilic) growth site of an electroinitiated polymer.

An electrophilic macro-object may, for example, consist of any crosslinked or noncrosslinked polymer functionalized at the end of or along its chain, or else in crosslinking zones, or any totally or partially functionalized macromolecule, or an object of nanometric or micrometric size or greater, the surface of which it has been possible to functionalize with vinyl groups activated with electro-withdrawing groups, such as, for example, the groups: methacrylate, acrylate, vinyl chloride, acrylonitrile, methacrylonitrile, 4-vinylpyridine, 2-vinylpyridine, etc., or else with cyclic groups, such as epoxy groups or, more generally, oxiranes or lactones such as $\epsilon$-caprolactone.

A nucleophilic macro-object may, for example, consist of any crosslinked or noncrosslinked polymer functionalized at the end or along its chain, or else in crosslinking zones, or any totally or partially functionalized macromolecule, or an object of nanometric or micrometric size or greater, the surface of which it has been possible to functionalize with vinyl groups activated with electro-donating groups, such as, for example, the group consisting of 4-vinylpyridine, 2-vinylpyridine, N-vinylpyrrolidone, etc., or else with cyclic groups, such as, for example, epoxy groups, oxiranes or lactones such as $\epsilon$-caprolactone.

The polarization can be obtained under voltammetric, potentiostatic or intensiostatic conditions, and produces grafted films of said macromonomer or of its condensation products on the working surface.

The use of these macro-objects makes it possible to obtain electrografted films containing the macrostructural portion. The grafting takes place due to the presence, on the macrostructural portion, of the electrophilic or nucleophilic groups. Since these groups are linked to the macrostructural portion, electrografting of this portion onto the surface is obtained.

The macro-objects which can be used in accordance with the present invention, due to the presence of their electrophilic or nucleophilic functional group(s), have at least one of the following properties:
- the macro-object is electroactive, and may in particular be electrografted onto an electrically conducting or semi-conducting surface;
- the macro-object is either capable of undergoing a nucleophilic addition from a nucleophilic growth site of an electroinitiated polymer, or is capable of effecting a nucleophilic addition to an electrophilic growth site of an electroinitiated polymer;
- the macro-object can be electropolymerized.

According to the invention, the electrolysis of the solution of the macroreagent is carried out by polarization under voltammetric, potentiostatic or intensiostatic conditions.

When the synthesis solvent is an organic solvent, it is preferably chosen from dimethylformamide, ethyl acetate, acetonitrile and tetrahydrofuran.

The method in accordance with the invention has the advantage of allowing the direct use of the solvents without it being necessary to subject them to prior distillation in order to eliminate the water that they contain, or to perform a strict control of the water content of the atmosphere above the reaction medium. As a result, the method in accordance with the invention can readily be implemented on an industrial scale.

The macro-objects which can be used according to the method in accordance with the invention are preferably chosen from the compounds of formulae below:

A-P

A-P-B $P(A)_n$ $[M(A)]_n$ $A-[M(B)]_n$ $A-[M(B)]_n-C$ $A-P-[M(B)]_n$ $A-P-[M(B)]_n-C$ in which:
P is a macrostructure chosen from:
- organic or inorganic oligomers and polymers,
- polymers obtained by polycondensation of one or more reagents,
- polysiloxanes, poly(ortho esters), polyphosphates, parylene and substituted parylene-based polymers,
- conducting polymers,
- oligopeptides and proteins,
- nucleic acid molecules,
- polysaccharides,
- substituted or unsubstituted porphyrins,
- substituted or unsubstituted phthalocyanins,
- polymers formed from substituted monomers or from substituted macromolecules from the list above,
- prepolymers, macromers or telechelics based on the monomers and/or macromolecules from the list above,
- copolymers and/or mixtures which can be formed from these polymers, from their constituent monomers or from the macromolecules above, which may or may not be substituted;
- macrostructures which are not polymeric and not strictly macromolecular, such as, for example, those obtained by crosslinking of a two- or three-dimensional network, for instance rubber, etc.,
- mineral aggregates,
- lipid vesicles such as liposomes and niosomes, and
- living cells,
- objects comprising at least one surface which can be functionalized with at least one electroactive group, and in particular an electrograftable group;

n is an integer greater than or equal to 1;
M is a constituent monomer unit of the structures of type P defined above when said structures are a polymer;
A, B and C, which may be identical or different, are chosen from electrophilic functional groups capable of participating in or of blocking the growth of an anionic polymerization, or nucleophilic functional groups capable of participating in or of blocking the growth of a cationic polymerization, A, B and C being linked via covalent, ionic or dative bonds, or via hydrogen bonding, with the macrostructural portion P or the monomeric portion M.

Among the polymers defined for P, mention may in particular be made of crosslinked or noncrosslinked vinyl polymers, such as, for example, polymers of acrylonitrile, of methacrylonitrile, of methyl methacrylate, of ethyl methacrylate, of propyl methacrylate, of butyl methacrylate, of hydroxyethyl methacrylate, of hydroxylpropyl methacrylate, of cyanoacrylates, of acrylic acid, of methacrylic acid, of styrene and of its derivatives, of N-vinylpyrrolidone, of vinyl halides, and polyacrylamides; polymers of isoprene, of ethylene, of propylene, of ethylene oxide and of molecules containing a ring that is cleavable by nucleophilic or electrophilic attack, such as lactones, and in particular ε-caprolactone.

Among the polymers obtained by polycondensation of one or more reagents, mention may in particular be made of polymers and copolymers of lactic acid or of its oligomers, of lactones and in particular ε-caprolactone, of glycolic acid, of ethylene glycol, polyamides, polyurethanes, poly(ortho esters) and polyaspartates.

Among the conducting polymers, mention may in particular be made of those based on aniline, on thiophene or on ethylenedioxythiophene (EDOT), on pyrrole, on their analogs or on their substituted derivatives.

Among the proteins, mention may in particular be made of antigens, enzymes, growth factors, antibodies and collagens.

Among the nucleic acid molecules, mention may in particular be made of single- and double-stranded DNA, and single- and double-stranded RNA.

Among the polysaccharides, mention may in particular, by way of example, be made of cellulose and substituted celluloses, chitosans and substituted or functionalized chitosans, dextrans and substituted or functionalized dextrans, amyloses, pectins, starch and heparin.

Among the mineral aggregates, mention may in particular be made of beads of silica and more generally of oxides, and also nanoobjects of any nature (nanobeads, nanotubes, fullerenes, etc.).

Among the objects having at least one surface which can be functionalized with at least one electroactive group, mention may be made of non-liquid and non-gaseous objects having at least one electrically conducting, semiconducting or insulating surface, chosen from metal, organic or mineral surfaces, such as wood, glass, plastic, plant fibers, keratin materials, organic or mineral gels, composites thereof or mixtures thereof.

The maximum number which can be defined for n is not critical according to the invention and depends on the number of functions present on the macrostructural portion that are capable of being functionalized with an electroactive group.

Among the functional groups A, B and C, mention may in particular be made of Lewis acids and bases carrying, respectively, an electron vacancy (and in particular groups containing the elements B or Al, ionized or nonionized transition metals, rare earth metals, etc.) or an electron doublet (and in particular groups containing the elements N, O, S, anions, and in particular carboxylate, sulfate, sulfonate, phosphate, phosphonate, etc., groups); organic functional groups that can be polymerized via the anionic route, such as vinyl groups, for instance methacrylate, acrylate, acrolein, acrylonitrile, methacrylonitrile, cyanoacrylates, vinyl halides, styrene and its derivatives, 2- and 4-vinylpyridine and their derivatives, vinylimidazoles and their derivatives, etc.; molecules containing a ring that is cleavable by nucleophilic attack, such as oxiranes and lactones, organic functional groups that can be polymerized by the cationic route, such as the groups: N-vinylpyrrolidone, 2- and 4-vinylpyridine, styrene and its derivatives, etc.; and molecules containing a ring that is cleavable by electrophilic attack, in particular oxiranes and lactones.

By way of example, $P(A)_n$ therefore denotes a macrostructure P as defined above, functionalized with n appropriate electrophilic or nucleophilic groups A.

To obtain simply electrophilic macro-objects, any polymer or macrostructure may, for example, be functionalized with electroactivated vinyl groups.

This functionalization may, for example, be carried out by exploiting the reaction of these hydroxyl groups with methacryloyl chloride (MAC) so as to form methacrylic esters, which will introduce a methacrylate electrophilic group into the macrostructure, and will allow it to be electrografted according to the method in accordance with the present invention according to scheme 2 hereinafter:

SCHEME 2

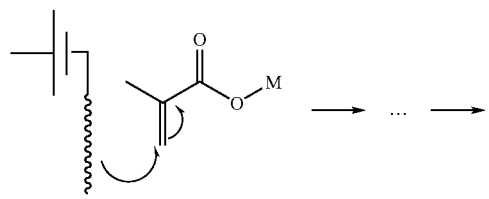

-continued

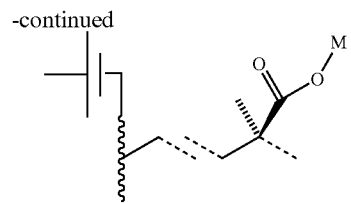

in which M has the meaning indicated above.

The same type of reactions can, for example, be envisioned with glycidyl methacrylate in place of the methacryloyl chloride.

The use of molecules which can serve as spacer elements, such as diisocyanates, epichlorohydrin and, more generally, any bifunctional molecule, in order to obtain the formation of a covalent bond between a vinyl monomer and a macrostructure, can also be considered.

According to a first variant of the method in accordance with the invention, the macro-object comprises at least one electrophilic organic functional group.

According to this first variant, the electrografting of the macro-object is carried out by electroreduction on the electrically conducting or semiconducting surface, which then serves as a cathode.

The concentration of the electrophilic macro-object in the electrolyte solution is preferably between $10^{-6}$ and 5 mol/l.

According to an advantageous embodiment of this first variant, the organic solution contains a solvent which can be chosen from the solvents as defined above.

According to another advantageous form of this first variant, the organic solution contains at least one support electrolyte which can in particular be chosen from quaternary ammonium salts such as perchlorates, tosylates, tetrafluoroborates, hexafluorophosphates or quaternary ammonium halides, sodium nitrate and sodium chloride.

Among these quaternary ammonium salts, mention may in particular be made, by way of example, of tetraethylammonium perchlorate (TEAP), tetrabutylammonium perchlorate (TBAP), tetrapropylammonium perchlorate (TPAP), or benzyltrimethylammonium perchlorate (BTMAP).

When the electrophilic macro-object used is electropolymerizable, it can then constitute the only electroactive species in the synthesis solvent.

In this case, the grafting and the growth of the film take place on the cathode as soon as its potential is greater, in absolute value, than the electroreduction potential for the electrophilic functional group.

This potential varies as a function of the nature of the electrophilic group and, for a given electrophilic group, of the macrostructural portion of the electrophilic macro-object.

By way of example, and when the electrophilic macro-object consists of a polyethylene glycol (PEG) dimethacrylate, functionalized at both its ends with methacrylate groups, then the electroreduction is carried out under voltammetric conditions, with a final potential of between −2.7 and −3.4 V/(Ag$^+$/Ag) (measured on a gold electrode in dimethylformamide (DMF) in the presence of TEAP), according to the molar mass of the central PEG portion.

When the electrophilic macro-object is non-polymerizable, the synthesis solution can then contain, in addition to the electrophilic macro-object, one or more electropolymerizable monomers, chosen in particular from those which constitute the electrophilic group of interest of the electrophilic macro-object. In this case, the monomers can be used in place of the solvent.

In this case, the grafting and the growth of the film take place on the cathode as soon as its potential is greater, in absolute value, than the least cathodic potential of the two potentials consisting of:
(i) the reduction potential for the electrophilic macro-object;
(ii) the reduction potential for the electropolymerizable monomer.

When the synthesis medium contains a non-polymerizable electrophilic macro-object and at least one polymerizable monomer, the grafting and the growth of the film take place on the cathode as soon as its potential is greater, in absolute value, than the reduction potential for the polymerizable monomer, the attachment of the macromonomer taking place by means of a reaction which terminates the growth of the chains formed from the monomer.

This potential can be obtained:
either by cathodically polarizing the working electrode at the appropriate value relative to a reference electrode (for example a silver electrode);
or by cathodically polarizing the working electrode relative to a counterelectrode, such that its potential, measured relative to a reference electrode, is correct;
or by applying a current in an electrical circuit, in which the surface to be treated is one of the electrodes (preferably the cathode), such that the potential of this surface is correct.

According to a second variant of the method in accordance with the invention, the macro-object comprises at least one nucleophilic organic functional group.

According to this second variant, the electrografting of the macro-object is carried out by electrooxidation on the electrically conducting or semiconducting surface, which then serves as an anode.

The concentration of the nucleophilic macro-object is preferably between $10^{-6}$ and 5 mol/l.

According to an advantageous embodiment of this second variant, the organic solvent contains a solvent which can be chosen from the solvents as defined above.

According to another advantageous embodiment of this second variant, the organic solvent contains at least one support electrolyte which can in particular be chosen from quaternary ammonium salts such as those described above.

When the nucleophilic macro-object used is electropolymerizable, it can then constitute the only electroactive species in the synthesis solvent.

In this case, the grafting and the growth of the film take place on the anode as soon as its potential is greater, in absolute value, than the electrooxidation potential for the nucleophilic functional group.

This potential varies as a function of the nature of the nucleophilic group and, for a given nucleophilic group, of the macromolecular portion of the nucleophilic macroreagent.

When the nucleophilic macro-object is non-polymerizable, the synthesis solution may then contain, in addition to the nucleophilic macro-object one or more electropolymerizable monomers, chosen in particular from those which constitute the nucleophilic group of interest of the nucleophilic macro-object. In this case, these monomers can be used in place of the solvent.

In this case, the grafting and the growth of the film take place on the anode as soon as its potential is less, in absolute value, than the most anodic potential of the two potentials consisting of:
(i) the oxidation potential for the nucleophilic macro-object;
(ii) the oxidation potential for the electropolymerizable monomer.

When the synthesis medium contains a non-polymerizable nucleophilic macro-object and at least one polymerizable monomer, the grafting and the growth of the film take place on the anode as soon as its potential is greater, in absolute value, than the oxidation potential of the polymerizable monomer, the attachment of the macromonomer taking place by means of a reaction which terminates the growth of the chains formed from the monomer.

This potential can be obtained:
either by anodically polarizing the working electrode at the appropriate value relative to a reference electrode (for example a silver electrode);
or by anodically polarizing the working electrode relative to a counterelectrode, such that its potential, measured relative to a reference electrode, is correct;
or by applying a current in an electrical circuit, in which the surface to be treated is one of the electrodes (preferably the anode), such that the potential of this surface is correct.

In all the cases (electrophilic or nucleophilic macro-object), the working electrode and the counterelectrode can be:
in contact with the same solution or else with different solutions;
placed in a single compartment or else in separate compartments.

In general, it is observed that the voltammetric currents are lower when the molar mass of the macrostructural central portion increases, all things otherwise being equal. This could be connected to the increasing viscosity of the reaction medium, and would result in the cathodic Efinal potentials being preferred as the viscosity of the electrolyte solution increases.

A subject of the present invention is, moreover, the electrically conducting or semiconducting surfaces obtained by implementing the method described above, and at least one face of which is covered with a grafted coating of a macro-object as defined above.

In general, this coating has a thickness at least equal to the size of the largest macrostructural portion contained in the macro-object.

According to a preferred embodiment of the invention, this coating has a thickness of between 1 nm and 10 µm.

It can particularly be in the form of a polymer film, of an organic film of a biological macromolecule, of a layer of beads or of nanotubes, of a layer of living cells, etc.

Among these surfaces, mention may in particular be made of metal surfaces such as gold in the form of slides or contacts, silver, platinum, iron, chromium, aluminum, alloys such as steel or stainless steels, titanium, conducting polymers, and also electrically semiconducting surfaces such as doped or undoped silicon, titanium nitride, tungsten nitride, tantalum nitride, titanium oxide, surfaces of conducting polymers or of coatings obtained from aryldiazonium salts, etc.

Finally, when the macro-object is an object of macroscopic size, at least one portion of whose surface it has been possible to cover with a film containing activated vinyl groups (either with the method of the present invention or with another method, such as, for example, the methods described in patent application FR-A-2 781 232 or in international application WO 98/55162), the method of the present invention can be used to perform "electrobonding" by placing said surface on the conducting or semiconducting surface of interest, and thus obtaining the attachment of said surface to the surface of interest.

A subject of the invention is therefore also the use of the method in accordance with the invention and as described above, for electrobonding macro-objects onto an electrically conducting or semiconducting surface.

BRIEF DESCRIPTION OF THE DRAWINGS

Besides the above arrangements, the invention also comprises other arrangements which will emerge from the following description, which refers to an example of formation of a polymer film by electrografting of PEG dimethacrylate to the surface of a gold electrode, to an example demonstrating that the electrografting method in accordance with the invention can be carried out in an organic solvent containing at least 100 ppm of water, to a comparative example of preparation of a poly(PEG-dimethacrylate)-co-methyl methacrylate polymer film at the surface of a gold slide, to an example of formation of poly(polydimethylsiloxane-methacrylate) films at the surface of a gold electrode, and to an example of formation of a dextran/methacrylate film at the surface of a gold electrode, and also to the attached figures in which.

EXAMPLE 1

Formation of a Polymer Film by Electrografting of an Electroactive and Polymerizable Macroelectrophile: PEG-Dimethacrylate The aim of this example is to demonstrate that it is possible to electrograft a macroelectrophile, i.e. a molecule carrying at least one electrophilic group covalently linked to a nonelectroactive macromolecular portion, in the presence of at least 100 ppm of protons, and that this condition is necessary for obtaining a grafted film having a certain thickness.

The macroelectrophile used is a PEG-dimethacrylate (PEG 330) of formula (I) below:

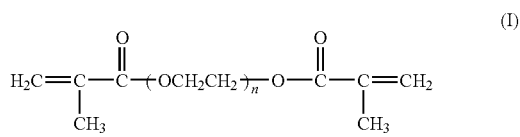

with n=4, 9 or 16.

For this, it is first of all shown that the macroelectrophile is not grafted when it is simply exposed to the surface of the gold electrode, but that it is grafted after polarization of this electrode in a cathode system.

To do this, a glass microscope slide coated with gold by evaporation on a chromium sublayer is soaked, for 10 minutes, in a 0.04 mol/l solution of PEG330 dimethacrylate (formula (I) with n=4) in dimethylformamide (DMF).

Figure 1:
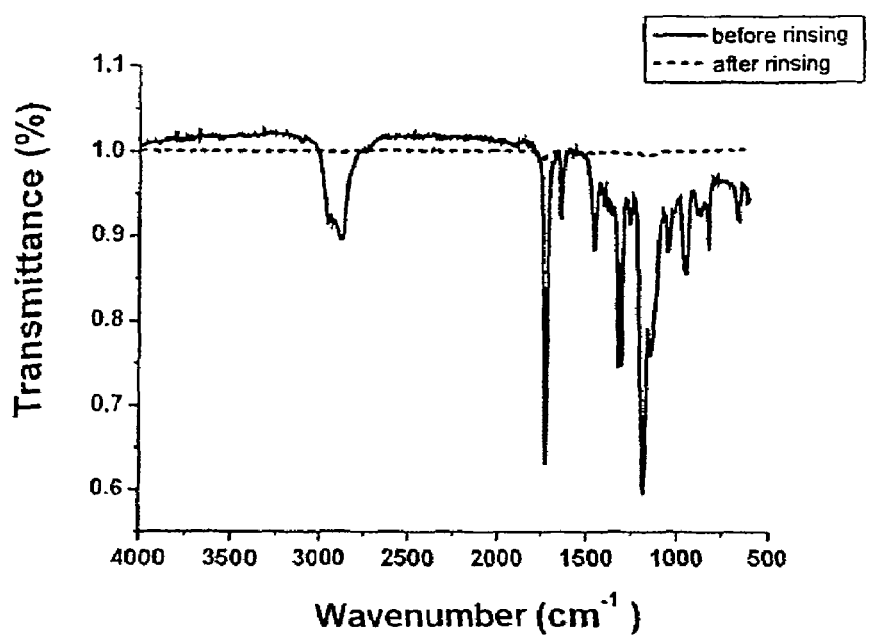
FIG. 1 represents the infrared (IR) spectra before and after various rinsing operations, when a gold slide is simply covered with a polymer film obtained by simple soaking of said slide (without an electrografting step) in a PEG330 dimethacrylate solution, at 0.04 mol/l in DMF.

FIG. 1 in the appendix represents the infrared (IR) spectra of the gold slide before and then after rinsing for 2 minutes in acetone in the presence of ultrasound, and then for 2 minutes in water in the presence of ultrasound. In this figure, the transmittance (%) is expressed as a function of the wavenumber ($cm^{-1}$).

Complete disappearance of the peaks characteristic of the PEG330 dimethacrylate, and in particular of the carbonyl band at 1740 $cm^{-1}$, is observed under the effect of the rinsing.

These results therefore show that it is not possible to graft in a long-lasting manner a macroelectrophile onto a gold surface by simply soaking said surface in a solution of this macroelectrophile.

By way of comparison, and in accordance with the method according to the invention, electrografting of three PEG dimethacrylates of formula (I) onto a gold slide (PEG330: n=4; PEG550: n=9 and PEG875: n=16) is performed.

To do this, a gold slide, identical to that used above, is polarized in a 0.04 mol/l solution of PEG dimethacrylate (PEG330; PEG550 or PEG875) in DMF containing $5 \times 10^{-2}$ mol/l of tetraethylammonium perchlorate (TEAP), according to the following protocol for potential: voltammetric conditions with 10 scans from $E_{initial}$=−0.5 V/($Ag^+$/Ag) to $E_{final}$= −2.7 V/($Ag^+$/Ag) at a rate of 100 mV/s.

In this example, it is important to note that the PEG dimethacrylates and the DMF were used as received from the manufacturer, i.e. in particular without prior distillation (the polymerization inhibitor of the product is therefore present, and the proton content of the medium is greater than 50 ppm).

The slides are then rinsed with acetone then with water according to the protocol described above.

Figure 2:
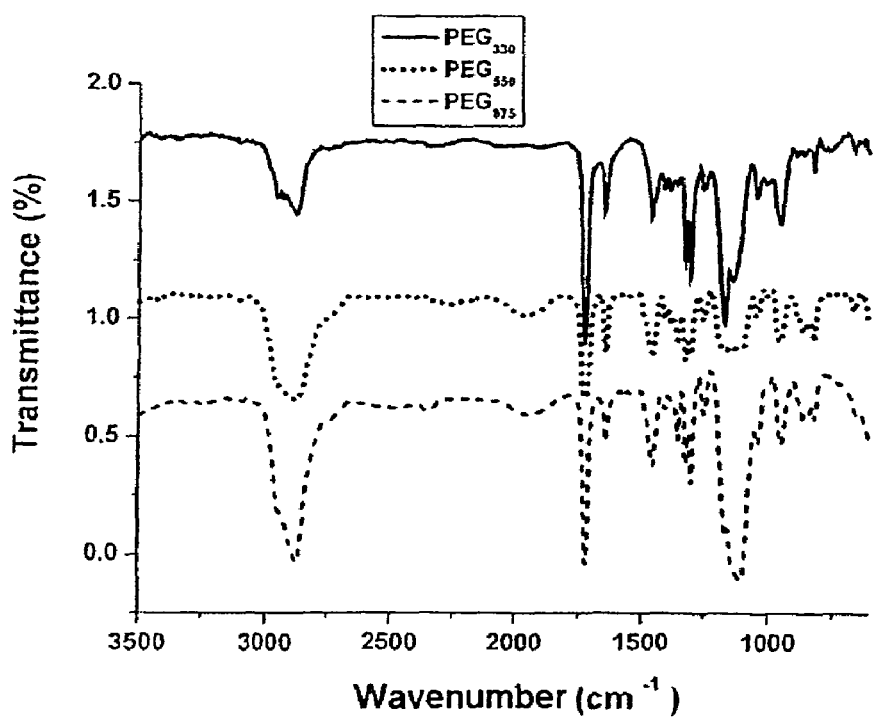
FIG. 2 represents the infrared (IR) spectra of gold slides onto which polymer films of various PEG dimethacrylates (PEG330, PEG550 and PEG875) have been electrografted in accordance with the method according to the invention.

The IR spectra of the slides after rinsing are recorded in FIG. 2 in the appendix, which represent the transmittance (%) as a function of the wavenumber ($cm^{-1}$).

After rinsing, films 100 nm thick, having the poly(PEG dimethacrylate) characteristics, are observed.

EXAMPLE NO. 2

Preparation of Films of Poly(PEG Dimethacrylate) Electrografted in the Presence of an Increasing Concentration of Water The aim of this example is to demonstrate that the presence of water during the polarization phase is not prejudicial to the quality of the films obtained in accordance with the invention, but that, on the contrary, it is necessary for obtaining good quality and desired thickness ranges.

A gold slide is polarized in a 1 mol/l solution of PEG 550 dimethacrylate in DMF containing $5 \times 10^{-2}$ mol/l of TEAP.

The water content of the medium for synthesis is adjusted before each polarization by adding volumes of distilled water to the solution, and is then measured by the Karl Fischer method.

Water contents ranging from 500 ppm to 4500 ppm were tested.

The potential protocol is as follows: voltammetric conditions with 10 scans from $E_{initial}=-0.7$ V/(Ag$^+$/Ag) to $E_{final}=-2.7$ V/(Ag$^+$/Ag) at a rate of 100 mV/s.

The slides are then rinsed with acetone and with water according to the protocol described above in Example 1.

Figure 3:
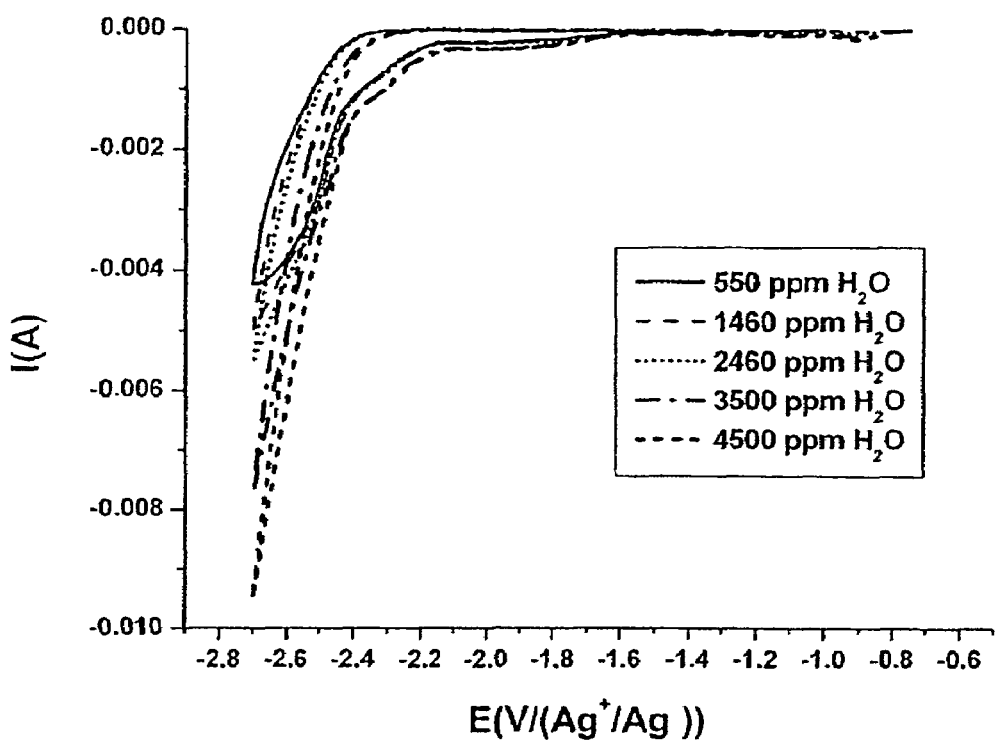
FIG. 3 represents the voltammograms of solvents containing increasing water contents, during the electrografting of PEG 550 dimethacrylate to the surface of a gold slide.

The first voltammograms for each of the water contents tested are indicated in FIG. 3, in which the current in amps is expressed as a function of the potential of the Ag$^+$/Ag counterelectrode.

It is noted that, as a rule, the currents are greater the higher the water content.

Nevertheless, after rinsing with acetone and with water, organic films are observed for which the structure (IR) is compatible with the poly(PEG dimethacrylate) and the thicknesses of which, measured by profilometry, are summarized in Table I below:

TABLE I

| Water content {ppm} | Transmittance C=O (%) | Thickness (nm) |
|---|---|---|
| <50 | 27 | 44 |
| 500 | 13 | 70 |
| 1460 | 13 | 70 |
| 2460 | 30 | 100 |
| 3500 | 30 | 100 |
| 4500 | 29 | 45 |

In the particular context of the electrografting of the poly (PEG dimethacrylate), these results show first of all that, when the water content of the reaction medium is less than 50 ppm, the grafted polymer film has a thickness that is less than that which is observed for the film grafted in the presence of an amount of water of between 500 and 3500 ppm.

These results also demonstrate that the grafting of a film close to 50 nm in thickness can still be achieved at 4500 ppm of water, which implies that it is possible to obtain grafting that is simply detectable at water contents or protic solvent contents that are even much higher. It should, however, be clearly understood that the maximum amount of proteins to be used according to the method in accordance with the invention may vary to a large degree as a function of the nature of the macro-object intended to be electrografted.

It is noted that the electrografting of the electrophilic macroreagent PEG550 dimethacrylate makes it possible to obtain polymer films that are grafted under water-content conditions that are much higher than those that are acceptable for strict electrograftable monomers, such as methyl methacrylate (MMA) for example, and most advantageous for implementing the method in accordance with the invention on an industrial level.

It is in fact observed that, above 900 ppm of water, the water content is greater than the support-electrolyte content ($5 \times 10^{-2}$ mol/l), and that the commercial "standard DMF" quality (i.e. not ultrapure) DMF has a water content, when received, of the order of 300 ppm.

These results, combined with the previous results, illustrate the practical benefit, in the context of use of the electrografting of polymers for industrial purposes, of having recourse to electrophilic or nucleophilic macro-objects of the type such as those indicated in the present invention.

EXAMPLE NO. 3

Preparation of Organic Films by Electrografting of Poly(PEG Dimethacrylate)-Co-Methyl Methacrylate A gold slide is polarized in various solutions containing $5 \times 10^{-2}$ mol/l of TEAP in DMF:

Solution A: 5 mol/l methyl methacrylate (MMA)+10% by volume PEG550 dimethacrylate;

Solution B: 10% by volume MMA+1 mol/l PEG550 dimethacrylate;

Solution C: 5 mol/l MMA alone;

Solution D: 1 mol/l PEG550 dimethacrylate alone.

In this example, the proton content of the reaction medium is greater than 50 ppm.

The potential protocol is as follows: voltammetric conditions with 10 scans from $E_{initial}=-0.7$ V/(Ag$^+$/Ag) to $E_{final}=-2.7$ V/(Ag$^+$/Ag) at a rate of 100 mV/s.

Figure 4:
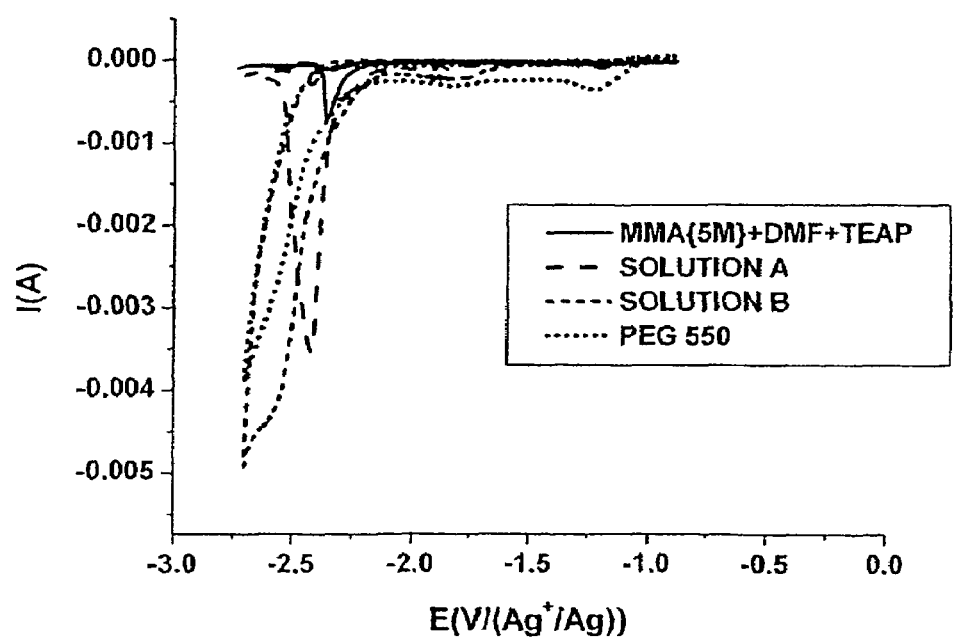
FIG. 4 represents the voltammograms of various solutions (solution A: methyl methacrylate (MMA) at 5 mol/l+PEG550 dimethacrylate, 10% by volume; solution B: 10% by volume MMA+1 mol/l PEG550 dimethacrylate; solution C: MMA alone at 5 mol/l, and solution D: PEG550 dimethacrylate alone at 1 mol/l) in trials for the formation of a polymer film at the surface of the gold slide.

The first voltammograms for each of the various solutions A to D are indicated in FIG. 4, in which the current in amps is expressed as a function of the potential of the Ag$^+$/Ag counterelectrode.

Figure 5:
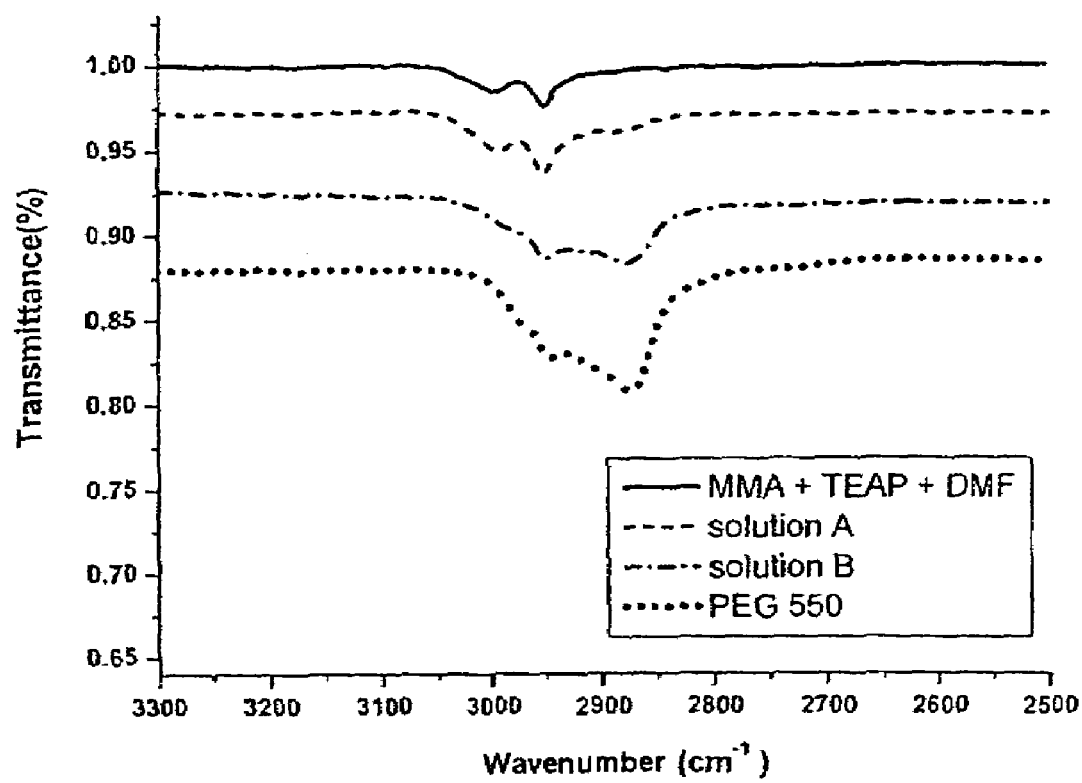
FIG. 5 represents the IR spectra of the polymer films obtained using solutions A to D described above.

The region 2500-3300 cm$^{-1}$ of the IR spectra of the corresponding films obtained, represented in FIG. 5 (transmittance (%) expressed as a function of the wavenumber (cm$^{-1}$); the base lines have been shifted so as to facilitate the reading thereof), shows the copolymerization of the MMA and of the PEG550 dimethacrylate in relative proportions that are compatible with the starting solutions.

The IR spectra of the films obtained in fact show that the relative proportion of PEG and of PMMA observed is in accordance with the composition of the initial mixture, and in particular of the ratio of the MMA to PEG, and confirms that the method in accordance with the invention makes it possible to obtain electrografted PEG/PMMA copolymers in the presence of a proton content greater than or equal to 50 ppm.

These results show that the electrografting of MMA alone can take place from −2.5 V/(Ag$^+$/Ag), whereas the electrografting of PEG dimethacrylate is only obtained beyond −2.7 V/(Ag$^+$/Ag).

It is observed that it is, however, possible to obtain electrografted organic films in the two cases, which appears to indicate that the electrografting of the PEG dimethacrylate onto the surface may be due:

either to direct electrografting of the PEG dimethacrylate, due to its electroactivity (in the case of polarization and potentials that are more cathodic than −2.7 V/(Ag$^+$/Ag));

or to the electrophilicity of the methacrylate groups of the PEG dimethacrylate: the macroelectric profile is therefore "captured" by the growth chemistry subsequent to the electrografting of the MMA (in the case of polarization at potentials that are less cathodic than −2.7 V/(Ag$^+$/Ag)).

The films obtained with solutions A and B have a thickness of approximately 90 nm.

EXAMPLE NO. 4

Preparation of Electrografted Poly(Polydimethylsiloxane-Methacrylate) Films

The aim of this example is to demonstrate that it is possible to electrograft a macroelectrophile comprising only one electroactive group, in the presence of a proton content greater than 100 ppm. Besides the macromonomer used here, the essential differences with Example No. 1 above are:
(i) that the macromonomer carries only one electroactive electrophilic function (a methacrylate function);
(ii) that the macromolecular portion has a much higher mass (Mw=10 000).

The macroelectrophile used is a polydimethylsiloxane (PDMS)-methacrylate, of formula $H_2C=C(CH_3)C(=O)—O—(Si(CH_3)_2—O—)_nH$, with n=134.

A gold slide identical to that used in Example 1 above is polymerized, by cathodic polarization, in a 0.05 mol/l solution of PDMS-methacrylate (10 g) in ethyl acetate (50 ml) containing $5 \times 10^{-2}$ mol/l of tetraethylammonium tetrafluoroborate (TATB), under potentiostatic conditions according to the following protocol: $E_{fixed}=-3.2$ V/(Ag$^+$/Ag) for 2400 seconds.

The gold slide is then rinsed with acetone then with water, according to the protocol described above in Example 1.

Figure 6:
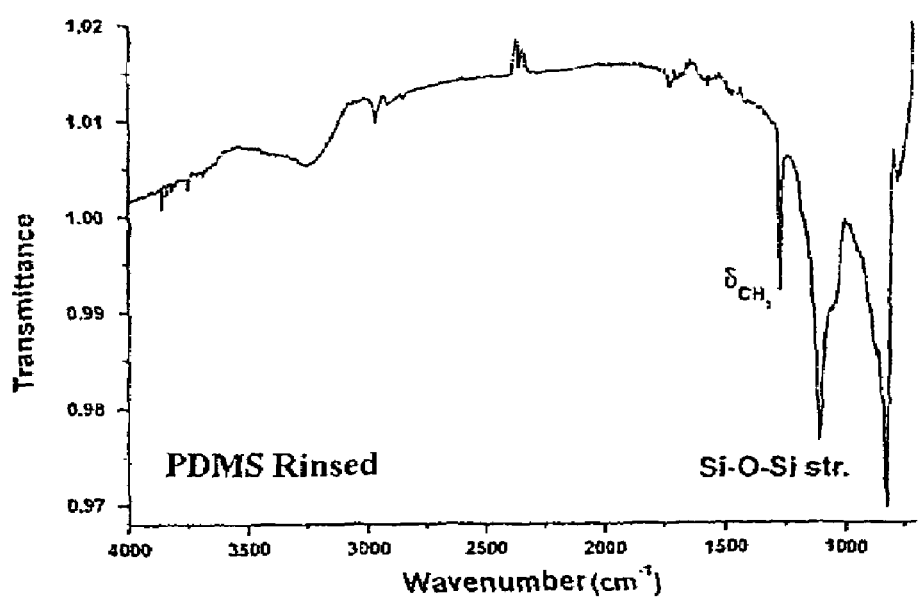
FIG. 6 represents the IR spectrum of a gold surface covered with a polydimethylsiloxane-methacrylate film electrografted by cathodic polarization.

FIG. 6 in the appendix represents the IR spectrum of the gold surface coated with the film of PDMS-methacrylate electrografted by cathodic polarization, the transmittance (%) being expressed as a function of the wavenumber (cm$^{-1}$).

After rinsing, an electrografted film 110 nm thick, having the infrared characteristics of PDMS is observed.

Figure 7:
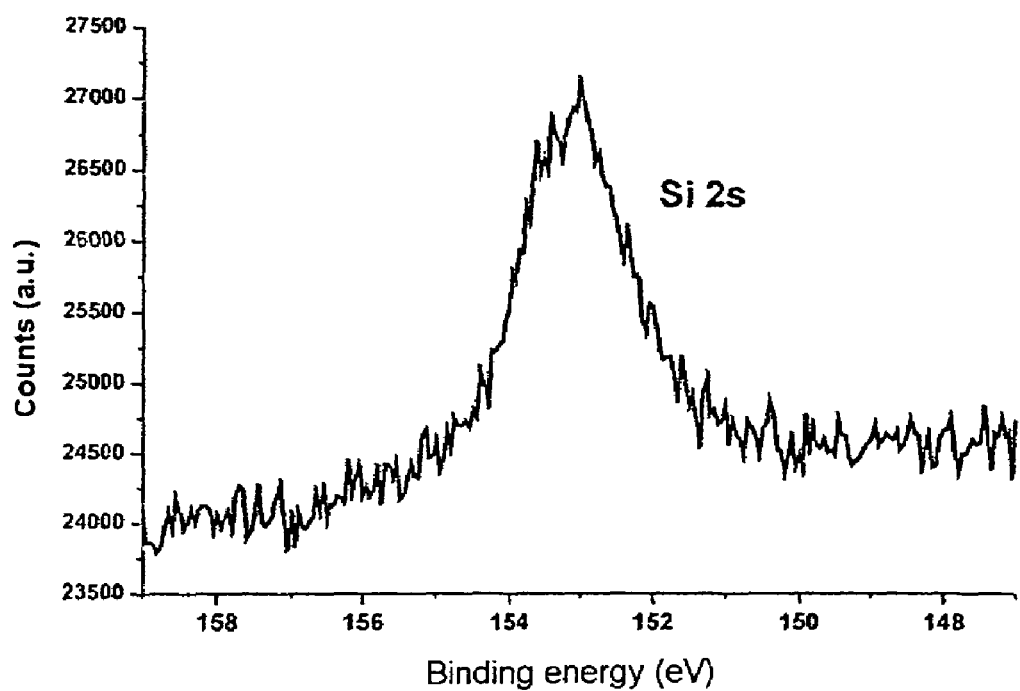
FIG. 7 represents the Si2s region of the XPS spectrum of a gold surface covered with a polydimethylsiloxane-methacrylate film electrografted by cathodic polarization.

The XPS analysis of the slide, which is represented in FIG. 7 in the appendix and which shows the presence of silicon on the surface, confirms this result (number of counts (a.u.) as a function of the binding energy (eV)).

EXAMPLE NO. 5

Preparation of an Electrografted Dextran/Methacrylate Film

The aim of this example is to demonstrate that it is possible to prepare an electrografted film using a macroelectrophile consisting of dextran functionalized with glycidyl methacrylate (GMA) groups. This example illustrates the invention in a specific field: that in which the macroelectrophile is indeed an already existing macromolecule but is not a polymer.

The macroelectrophile under consideration, called dextran-GMA, is represented by the formula below:

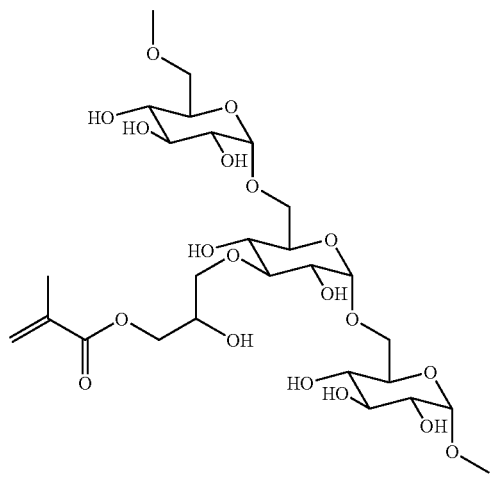

In the formula above, and in the interests of clarity, only one hydroxyl has been indicated as being substituted with GMA. The proportion in fact varies as a function of the synthesis conditions.

The dextran-GMA is obtained from a dextran of mass M=15 000 and from glycidyl methacrylate (2,3-epoxypropyl methyl propenoate), according to the protocol described in W. N. E. by van Dijk-Wolthuis, O. Franssen, H. Talsma, M. J. van Steenbergen, J. J. Kettenes-van den Bosch, W. E. Hennink, Macromolecules, 1995, 28, 6317.

Analysis of the product by $^1$H and $^{13}$C NMR (not represented) shows that the dextran-GMA is obtained with a degree of substitution of 77%.

A solution, referred to as dextran-GMA solution, is prepared by dissolving 0.25 g of the dextran-GMA in 50 ml of DMF containing $10^{-2}$ mol/l of TEAP. The solution therefore contains approximately $3.3 \times 10^{-4}$ mol/l of dextran-GMA.

A few gold surfaces, called gold slides, are prepared by spraying gold, by means of the Joule effect, onto glass slides pretreated with a chromium mist.

A first sample is prepared by soaking the gold slide in the dextran-GMA solution.

The slide is analyzed (IRAS) before and after rinsing with water for 5 minutes with agitation, in a proportion of approximately 2 ml/cm$^2$.

Figure 8:
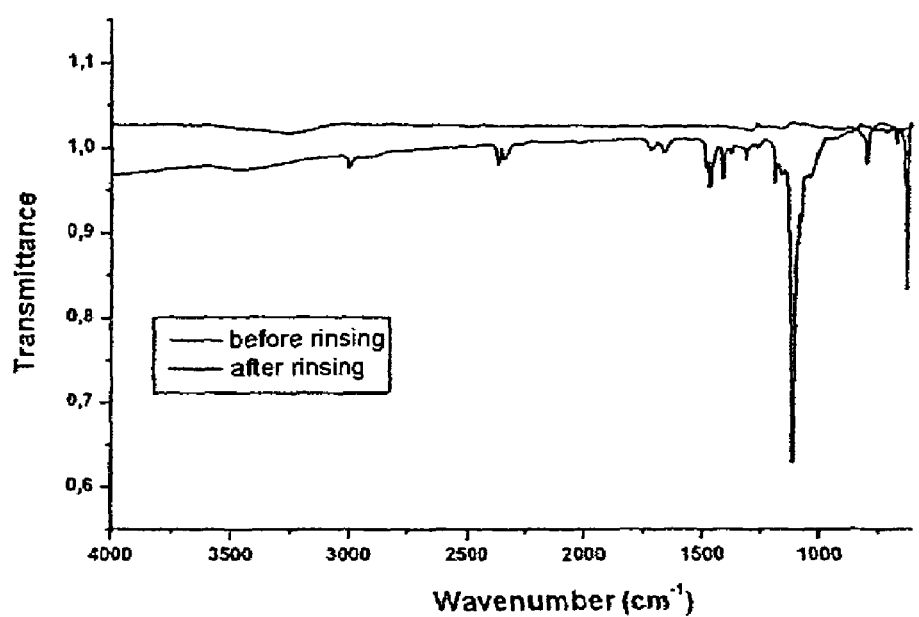
FIG. 8 represents the IRAS spectra of a film obtained by simple soaking of a gold slide in a solution of dextran-GMA, before and after rinsing in water.

The results obtained are shown in FIG. 8, in which the transmittance (%) is expressed as a function of the wavenumber (cm$^{-1}$).

It is observed that the dextran-GMA film obtained by simple soaking disappears after rinsing.

Next, the dextran-GMA is electrografted, according to the method in accordance with the invention, onto a gold slide used as working electrode in a three-electrode assembly, in the dextran-GMA solution, according to the following potential protocol: voltammetric conditions with 15 scans from $E_{initial}=-0.6$ V/(Ag$^+$/Ag) to $E_{final}=-2.8$ V/(Ag$^+$/Ag) at a rate of $-100$ mV/s.

Figure 9:
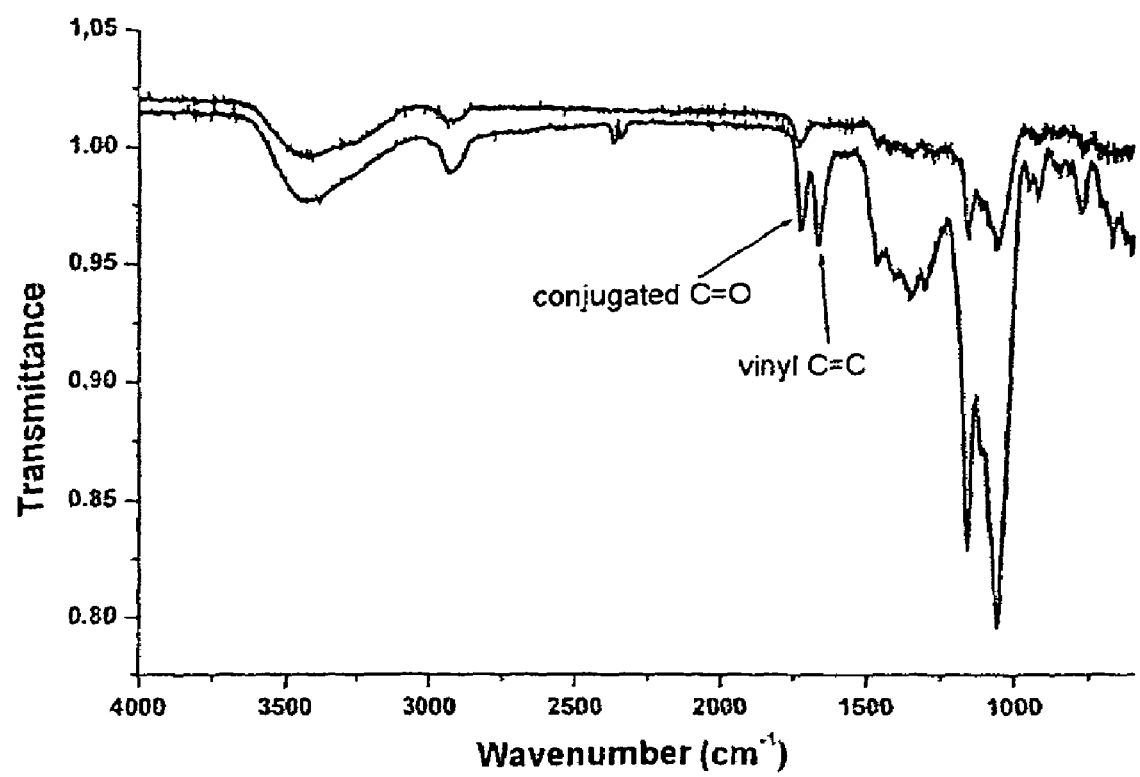
FIG. 9 represents the IRAS spectra of a film obtained by electrografting of dextran-GMA onto a gold slide, before and after rinsing in water.

After rinsing the slide with acetone and with water according to the same protocol as that described above in Example 1, a film is obtained which is 200 nm thick and the characteristics of which, verified by IR spectrophotometry, correspond to those of the poly(dextran-GMA) (FIG. 9 in which the lower curve represents the IR spectrum of the slide before rinsing and the upper curve represents the IR spectrum after rinsing).

It is important to note that the water content of the synthesis solution was of the order of 5000 ppm.

The invention claimed is:

1. A method for attaching macro-objects to an electrically conducting or semiconducting surface by electrografting, comprising:
   a) preparing an electrolyte solution comprising, in dissolved, particulate or emulsified form, at least one macro-object consisting of a macrostructural portion functionalized with at least one electroactive group and capable of resulting in the electro grafting of said macro-object to said surface, said electrolyte solution having a proton content of greater than or equal to 50 ppm, the said protons being provided by the solvents which make up said solution and/or by the macro-objects used in the course of the electrografting method and being present in the electrolyte solution; then
   b) electrolyzing said solution in an electrolysis cell using the conducting or semiconducting surface to be coated as working electrode and at least one counterelectrode, so as to result, by electroreduction or electrooxidation of said solution, in a grafted coating of said macro-object or of its condensation products on said surface.

2. The method as claimed in claim 1, wherein the proton content ranges between 50 and 100 000 ppm.

3. The method as claimed in claim 1, wherein the electroactive groups are chosen from:
    electrophilic groups capable of undergoing a nucleophilic addition from a nucleophilic growth site of an electroinitiated polymer;
    nucleophilic groups capable of effecting a nucleophilic addition on an electrophilic growth site of an electroinitiated polymer.

4. The method as claimed in claim 3, wherein the electrophilic groups are chosen from vinyl groups activated with electron-withdrawing groups or with cyclic groups that are cleavable by nucleophilic or electrophilic attack.

5. The method as claimed in claim 3, wherein the nucleophilic groups are chosen from vinyl groups activated with electron-donating groups or with cyclic groups that are cleavable by nucleophilic or electrophilic attack.

6. The method as claimed in claim 1, wherein the macro-objects are chosen from the compounds of formulae below:

A-P

A-P-B

P(A)n

[M(A)]n

A-[M(B)]n

A-[M(B)]n-C

A-P-[M(B)]n

A-P-[M(B)]n-C in which:
    P is a macrostructure chosen from:
    organic or inorganic oligomers and polymers,
    polymers obtained by polycondensation of one or more reagents,
    polysiloxanes, poly(ortho esters), polyphosphates, parylene and substituted parylene-based polymers,
    conducting polymers,
    oligopeptides and proteins,
    nucleic acid molecules,
    polysaccharides,
    substituted or unsubstituted porphyrins,
    substituted or unsubstituted phthalocyanins,
    polymers formed from substituted monomers or from substituted macromolecules from the list above,
    prepolymers, macromers or telechelics based on the monomers and/or macromolecules from the list above,
    copolymers and/or mixtures which can be formed from these polymers, from their constituent monomers or from the macromolecules above, which may or may not be substituted;
    macrostructures which are not polymeric and not strictly macromolecular,
    mineral aggregates,
    lipid vesicles, and
    living cells,
    objects comprising at least one surface which can be functionalized with at least one electroactive group;
    n is an integer greater than or equal to 1;
    M is a constituent monomer unit of the structures of type P defined above when said structures are a polymer;
    A, B and C, which may be identical or different, are chosen from electrophilic functional groups capable of participating in or of blocking the growth of an anionic polymerization, or nucleophilic functional groups capable of participating in or of blocking the growth of a cationic polymerization, A, B and C being linked via covalent, ionic or dative bonds, or via hydrogen bonding, with the macrostructural portion P or the monomeric portion M.

7. The method as claimed in claim 6, wherein the polymers defined for P are chosen from crosslinked or noncrosslinked vinyl polymers, and polymers of isoprene, of ethylene, of propylene, of ethylene oxide and of molecules containing a ring that is cleavable by nucleophilic or electrophilic attack.

8. The method as claimed in claim 6, wherein the polymers obtained by polycondensation of one or more reagents are chosen from polymers and copolymers of lactic acid or of its oligomers, of lactones, of glycolic acid, of ethylene glycol, polyamides, polyurethanes, poly(ortho esters) and polyaspartates.

9. The method as claimed in claim 6, wherein the conducting polymers are chosen from polymers based on aniline, on thiophene or on ethylenedioxythiophene, on pyrrole, on their analogs and on their substituted derivatives.

10. The method as claimed in claim 6, wherein the proteins are chosen from antigens, enzymes, growth factors, antibodies and collagens.

11. The method as claimed in claim 6, wherein the polysaccharides are chosen from cellulose and substituted celluloses, chitosans and substituted or functionalized chitosans, dextrans and substituted or functionalized dextrans, amyloses, pectins, starch and heparin.

12. The method as claimed in claim 6, wherein the objects having at least one surface capable of being functionalized with at least one electroactive group are chosen from nonliquid and nongaseous objects having at least one electrically conducting, semiconducting or insulating surface, chosen from metal, organic or mineral surfaces, such as wood, glass, plastic, plant fibers, keratin materials, organic or mineral gels, and composites thereof or mixtures thereof.

13. The method as claimed in claim 6, wherein the functional groups A, B and C are chosen from Lewis acids and bases carrying, respectively, an electron vacancy or an electron doublet; organic functional groups that are polymerizable via the anionic route and organic functional groups that are polymerizable via the cationic route.

14. The method for electrobonding macro-objects onto an electrically conducting or semiconducting surface, comprising the implementation of the method for attaching macro-objects by electrografting as defined in claim 1.

* * * * *

UNITED STATES PATENT AND TRADEMARK OFFICE
CERTIFICATE OF CORRECTION

PATENT NO. : 7,591,937 B2
APPLICATION NO. : 10/508665
DATED : September 22, 2009
INVENTOR(S) : Bureau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this

Twenty-first Day of September, 2010

David J. Kappos
*Director of the United States Patent and Trademark Office*